United States Patent [19]

Frech

[11] 4,093,370
[45] June 6, 1978

[54] INDICIA RECORDING DEVICE
[75] Inventor: Roger A. Frech, Canoga Park, Calif.
[73] Assignee: Terminal Data Corporation, Woodland Hills, Calif.
[21] Appl. No.: 805,761
[22] Filed: Jun. 13, 1977

Related U.S. Application Data
[63] Continuation-in-part of Ser. No. 589,292, Jun. 23, 1975, abandoned.
[51] Int. Cl.² ............... G03B 27/52; G03B 27/70
[52] U.S. Cl. .................................. 355/43; 355/49; 355/51; 355/54; 355/66
[58] Field of Search .................. 355/43, 40–42, 355/47–49, 50, 51, 53, 54, 65, 66, 84, 39

[56] References Cited
U.S. PATENT DOCUMENTS

| | | | |
|---|---|---|---|
| 3,241,436 | 3/1966 | Thornthwaite et al. | 355/66 X |
| 3,689,149 | 9/1972 | Livingood | 355/54 X |
| 3,796,489 | 3/1974 | Sone et al. | 355/54 |
| 3,802,773 | 4/1974 | Schneider | 355/43 |
| 3,902,802 | 9/1975 | Murata et al. | 355/43 |

Primary Examiner—Richard A. Wintercorn
Attorney, Agent, or Firm—Harry R. Lubcke

[57] ABSTRACT

A compound optical system apparatus, having a main optical path with a reflector, a shutter, an objective lens, and an image-receiving surface; and an alternately activated folded auxiliary optical path, with quasi-collimative reflective elements, one closely peripherally disposed to the main optical path, for passing a relatively small auxiliary image through the objective lens and displaying it upon the image-receiving surface on the side of the main image that is opposite to the side where the one reflective element is positioned with respect to the objective lens.

9 Claims, 4 Drawing Figures

INDICIA RECORDING DEVICE

This is a continuation-in-part of application, Ser. No. 589,292, filed June 23, 1975 now abandoned.

BACKGROUND OF THE INVENTION

The prior art has often assembled optical systems for superimposing background and foreground visual information for giving the impression that performers are located at exotic locations that are actually provided only by slides or illuminated photographs.

Half-silvered mirrors have often been employed to accomplish the actual combination of the images. Alternately, the second (the background) scene is astigmatically predistorted so that an inclined mirror is capable of directing the second scene to an image-receiving surface without optically interfering with the light rays of the main image.

At other times the auxiliary object, which may be a counter register of numerals is simply placed in the main field of view at one side and is imaged by an objective lens as a part of the main field of view.

Still another arrangement employs a second lens that is moved into the optical path of the first lens when an auxiliary image is to be impressed upon an image-receiving surface, and then the second lens is moved out of the optical path of the first lens when the normal field-of-view is to be imaged upon the image-receiving surface.

A further arrangement has a very narrow auxiliary object, an incandescent filament, and a non-collimating mirror to pass light from the filament through a common objective lens to form a simple line image assymmetrically located with respect to the main image.

SUMMARY OF THE INVENTION

An auxiliary optical device for imaging an auxiliary object upon an image-receiving surface along a quasi-collimated reflective optical path through the objective lens of a main optical system. The auxiliary object may be a light-emitting or an externally illuminated line of indicia.

The auxiliary image is selectively alternately symmetrically formed upon the image-receiving surface to one side of the image of the field of view of the main image of the objective lens, and on the side thereof that is opposite to the placement of the auxiliary optical device on the field-of-view side of the objective lens.

DESCRIPTION OF THE PREFERRED EMBODIMENTS

Figure 1:
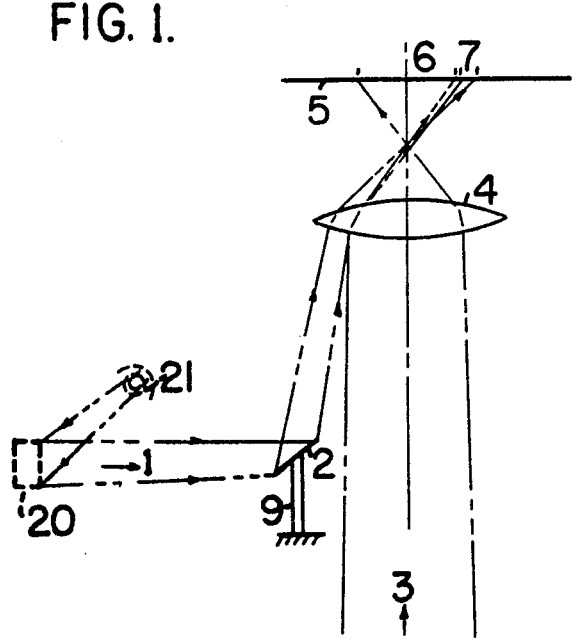
FIG. 1 is a plan view of the elemental optical system.

In FIG. 1, numeral 1 indicates the path of quasi-collimated optical information from an illuminated generically-represented object 20. This object may be self-illuminated, as light-emitting indicia, or it may be illuminated by a light source 21.

Ray path 1 encounters reflective means 2, which may be a small mirror, only sufficiently large to pass on a narrow bundle of rays to comprise path 1. It is accordingly small, and this allows it to be closely adjacent to path 3, which is comprised of main optical information from a field-of-view, not shown. Mirror 2 remains permanently in its peripheral position.

Main lens 4 is typically an image-forming lens of photographic quality, having an optical axis directed to the main field-of-view, and at a slight angle to path 1 between reflective means 2 and lens 4. The field-of-view is typically a document.

Image-receiving surface 5 may be any relatively planar real surface, such as unexposed photographic film.

A main image 6 is formed thereon, symmetrically with respect to the axis of lens 4 of the field-of-view. An auxiliary image 7 is formed assymmetrically with respect to that axis, but symmetrically with respect to main image 6, and on the side opposite to incoming path 1, according to the laws of optics.

The area of auxiliary object 20 is small with respect to the area of main image 6. Mirror 2 may thus be small and the ray bundle collected and reflected by it may have a small cross-sectional area. Hence, there is a quasi-collimated characteristic; i.e., a seemingly collimated characteristic, for auxiliary optical path 1.

In an application of the invention the auxiliary optical information may be alpha-numeric and unique to the particular characteristic of the field-of-view at the time the exposure is taken, such as the name and/or page number of a document, or an identifying index to be used for retrieval of that exposure at a later time with other apparatus.

Figure 2:
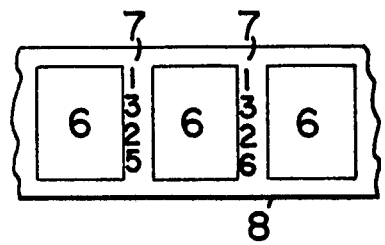
FIG. 2 is an elevation, of a typical film having main and auxiliary optical information.

A typical arrangement of main and auxiliary images is shown in FIG. 2. A film strip 8, which may be 16 mm wide, carries plural main images 6 and related auxiliary images 7 therebetween. The orientation of the numeric information, as the "1, 3, 2, 5" shown, may be anything that is peripherally related to the main image. The number of digits provided may be varied within the limits of the space available.

Figure 3:
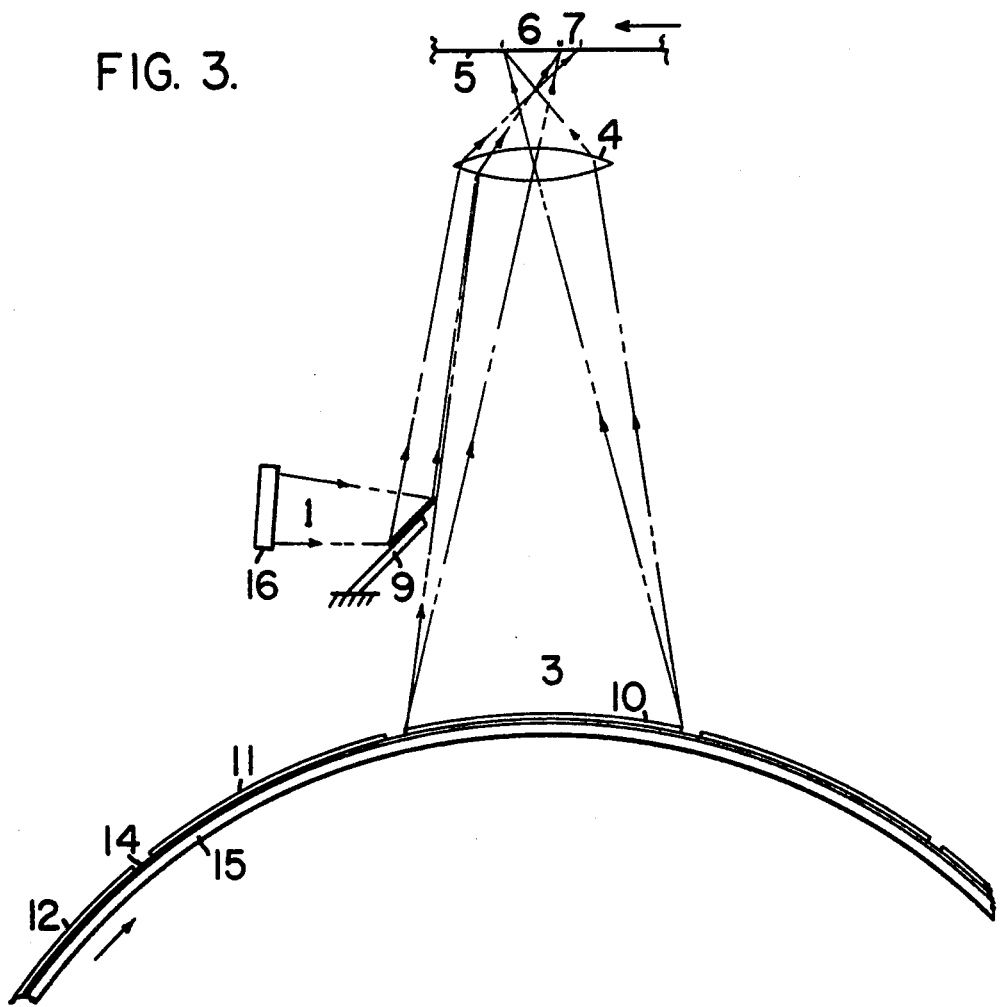
FIG. 3 is a plan view of a specific embodiment of the indicia recording device.

FIG. 3 shows the optics of FIG. 1 applied to a camera, typically of the intermittent flow type, of which the camera in U.S. Pat. No. 3,645,619, to Burton et al, 1972, is an example.

The field-of-view, for example, is comprised of successively positioned documents 10, 11, 12, and so on. These may be fastened to a belt 14 that passes around drum 15. The drum is of such size that a document, such as 10, is sufficiently flat as to be entirely in focus when it constitutes the main optical information of path 3.

Identifying numerical references previously employed in the drawing of FIG. 1 are repeated for corresponding elements in the drawing of FIG. 3.

As shown in FIG. 3, auxiliary optical information can be derived from electrically energized light-emitting devices shown as 16. This may be an aligned group of digital incandescent lamps, gas discharge electrode glow lamps, light-emitting diodes, or equivalent presently known devices, such as are used for computer read-out or for digital voltmeter indicators. Alternately, this may be comprised of reflected light data, as from object 20 in FIG. 1, and this may include small graphic data.

The subject matter employed as the auxiliary object is mirrored in mirror 2 and impinges essentially at one side of object lens 4, so that the desired image will be at the other side of the main image, as shown in FIG. 2.

Figure 4:
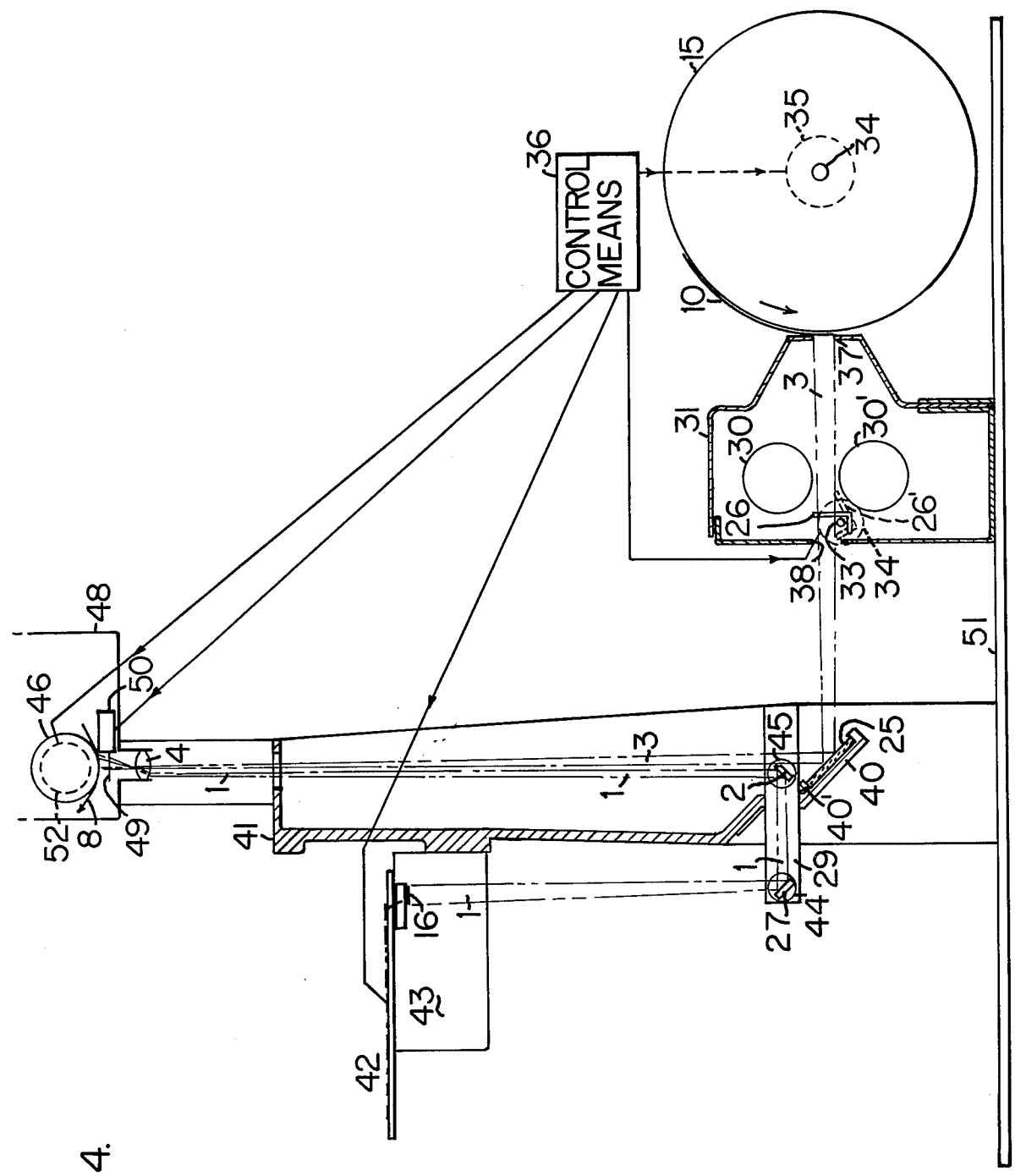
FIG. 4 is a side elevation of a complete apparatus according to the invention, in section along the centerline of the light paths.

Image receiving surface 5 in FIG. 4 is the unexposed film 39 of U.S. Pat. No. 3,645,619. This film winds over a relatively small diameter capstan, but since a slit aperture is employed adjacent to the main object 10, any curvature of object 10 or film 39 (8) is not significant insofar as maintenance of focus is concerned.

Lens 4 may be a plural-element corrected lens rather than the simple converging lens shown.

In alternate embodiments the source of main optical information for path 3 may be from fully flat subject matter and the main image 6 may comprise the whole field-of-view, as shown in FIGS. 1 and 3.

In FIG. 3 the placement of auxiliary object 16 and mirror 2, along with support 9 is such as to give trailing relation between image 7 and the main image 6 to which it relates.

If this relation is to be reversed, to give a leading relation, then elements 16, 2 and 9 are positioned on the opposite side of FIG. 3. Image 7 then appears at the left of image 6. A similar modification is made to give any other desired relation between images 6 and 7.

The length of the total optical path between auxiliary object 20 or 16 and lens 4 should be closely the same as the length of the main optical path 3, as from document 10 to lens 4, so that both images 6 and 7 will be in-focus on image-receiving surface 5.

The auxiliary device of FIGS. 1 and 3 is provided with a lighttight enclosure, not shown, when unexposed film is employed for image-receiving surface 5. This may be essentially the enclosure of the main optical device with which it is associated.

The essential structure of the present invention has been set forth above. FIG. 4 shows the more detailed structure of an actual embodiment. However, the major elements of FIG. 4 are to be generically interpreted as present in FIGS. 1 and 3.

Initially following the structure of FIG. 3, drum 15 carries document 10. This drum may have a circumferential extent as shown, or more or less, and an axial extent of up to 30 centimeters (cm). The apparatus has been constructed to handle 8 ½ inch × 11 inch (23 × 28 cm) paper sheets, or smaller.

Drum 15 is rotatable about an axial shaft 34 by means such as a known a.c. synchronous motor. It thus rotates at a uniform speed and is energized or deenergized by control means 36, which is typically a microprocessor. The motor is element 35.

The image light flux taken from document 10 is circumferentially of slit proportions, as defined by aperture 37.

This portion of the document is illuminated by a light source, which may be a pair of fluorescent lamps 30 and 30'. These are oriented parallel to and coextensive with shaft 34; they are positioned on either side of main optical path 3.

A similarly coextensive shutter 26 is adjacent to the lamps and slightly farther along path 3. It preferably has an angle, or "L" shape, with shaft-like pivots 33 at either end. These journal in stationary bearings and one pivot is given an angular force of rotation by rotary actuator 34. The latter is electrically connected to control means 36 for moving the shutter a fraction of one revolution forward or backward.

In position 26, shown in solid lines in FIG. 4, the shutter occludes main optical path 3. In position 26', shown in dotted lines, the shutter is rotated clockwise out of this path.

The shutter, and the lamps as well, are enclosed by a shutter housing 31, which has an exit aperture 38 that defines the cross section of main optical path 3.

As a matter of preferred orientation of the elements, path 3 is reflected at substantially 90° by means to reflect 25. This is shown as a first surface mirror, but it may be an equivalent prism of the right-angle type.

Reflective means 25 is mounted within the pocket of extension 40 of vertical frame 41. The extension and reflective means extend the 30 cm width of documents that can be processed; i.e., in a direction at right angles to the plane of the paper of FIG. 4. Clips 40' retain the mirror within the pocket.

Path 3 thus continues vertically upward to lens 4, in the same manner as in FIGS. 1 & 3.

In FIG. 4, optical path 1 originates at auxiliary object 16. This object is typically a self-luminous row of alphanumeric characters extending at right angles to the plane of the paper in the figure. Commercially, these characters may be the Beckman Corporation type SP332 gas discharge array.

The characters are caused to be illuminated in the configuration desired, such as "1", "2", "3", etc., by electronics upon printed circuit board 42 electrically connected to the "5 × 7" makeup of the characters, which electronics is also electrically connected for actuation to control means 36.

In order to reproduce the four digit number shown at reference numeral 7 in FIG. 2, four characters are aligned. More or less that four characters may be provided and the orientation, one to the other, may be as desired.

Circuit board 42, to which characters 16 are attached, is structurally attached to angle bracket 43, which is attached to vertical frame 41.

Auxiliary optical path 1 first proceeds downward, being intercepted by quasi-collimating reflective means 27, at an angle of the order of 45°. A simple such reflecting means is a mirror.

Path 1 proceeds to the right in FIG. 4 and encounters a second such quasi-collimating means 2 that is adjacent to path 3, such as is also shown in FIGS. 1 and 3. In FIG. 4 path 1 then is reflected approximately vertically upwards. It is convenient to thus fold optical path 1 so that it is approximately the same length as optical path 3. As before, path 1 impinges peripherally upon objective lens 4.

Reflective means 27 and 2 may be right angle prisms rather than first surface mirrors.

These reflective means are both fastened to mount 29, formerly mount 9, preferably by revolvable inserts 44 and 45. These allow adjustment of the angle of reflection.

Film 8, upon which the composite exposure of the two optical paths is made, is defined in the present apparatus by the lower periphery of capstan 46. This is rotated synchronously with, and in the opposite direction to, the rotation of document drum 15. Since a slit image is involved the nominal curvature of either optical surface is not of consequence with respect to the focus of the image.

The outer case 48 of a camera means, such as disclosed in the previously referred-to U.S. Pat. No. 3,645,619, is shown in part in FIG. 4. A capping shutter 49 is located adjacent to lens 4. It is typically reciprocated into or out of the optical paths by actuator 50. The shutter is used to make the camera light-tight at such times as the apparatus is not in operation. The actuator is controlled by control means 36.

If it is desired that camera case 48 be oriented with the optical axis horizontal rather than vertical as shown, the combined optical paths 1 and 3 are reflected at a right angle toward the right in FIG. 4, by reflective means placed in these paths at approximately the height of indicia 16.

For such a modification the sequence of the characters of the indicia are changed. As shown, the characters are arranged in the reverse order to that desired upon film 8; for an additional reflection the characters are arranged in the order desired upon film 8.

The several major elements of the structure of the invention are mounted upon base 51, which includes an extension for supporting camera 48.

Capstan 46 is typically mechanically coupled to drum 15 for synchronous operation. Electrically controlled clutch 52 is provided to drive the capstan under the control of electronic control means 36.

I claim:

1. A compound optical system apparatus, comprising;
   (a) a main optical path (3), having,
      (1) an image-receiving surface (5,8),
      (2) an objective lens (4) for forming an image of a document (10) over a major increment (6) of the area of said image-receiving surface, and
      (3) a shutter (26) in said main optical path adjacent to said document,
   (b) an auxiliary object (20, 16) comprised of a line of indicia,
   (c) an auxiliary optical path (1), having at least one quasi-collimative reflective means (2) small in area with respect to said major increment of area (6) and not greater than the area of said line of indicia, and a length substantially equal to the length of said main optical path,
   (d) mounting means (9, 29) to position one said quasi-collimative reflective means (2) in close peripheral relation to, and spaced from, said objective lens (4) on the document side thereof, to cause said auxiliary optical path between said auxiliary object and said reflective means (2) to lie at an angle to the direction of said main optical path, and such as to alter the direction of said auxiliary optical path to lie approximately parallel to the direction of, and closely adjacent to said main optical path, through said objective lens near the periphery thereof and to impinge upon a minor increment (7) of said image-receiving surface adjacent to, and symmetrically aligned with, said image (6) of said document, on the side thereof opposite to the position of said reflective means (2), and
   (e) control means (36) connected to synchronously move said document (10) and said image-receiving surface (8),
   and connected to said shutter and to said indicia, to alternately occlude said main optical path by means of said shutter, and to simultaneously cause said indicia to be illuminated.

2. The optical apparatus of claim 1, in which;
   (a) each said reflective means (2, 27) of said auxiliary optical path is a plane mirror having a height less than the height of said line of indicia.

3. The optical apparatus of claim i, in which;
   (a) the angle of said reflective means (2) to the optical axis of said objective lens (4) is greater than 45°.

4. The optical apparatus of claim 1, in which;
   (a) said image-receiving surface (5) is a light-sensitive medium (8),
   and which additionally includes,
   (b) moveable drum means (15) for successively presenting plural documents to said main optical path (3).

5. The optical apparatus of claim 1, in which;
   (a) said auxiliary object is comprised of a single line of light-emitting alpha-numeric subject matter (16).

6. The optical apparatus of claim 1, in which;
   (a) said auxiliary object is a line of indicia having separate illuminating means (21) to provide optical information by reflected light.

7. The optical apparatus of claim 1, in which;
   (a) said image-receiving surface is a strip of photographic film (8),
   (b) said image (6) is the image of a document (10), and
   (c) said auxiliary object (16) is comprised and oriented to cause
   said image thereof upon said minor increment (7) to lie between successive said images of said documents.

8. The optical apparatus of claim 1, in which said shutter (26) is comprised of;
   (a) an opaque element having a right-angle cross-section,
   (b) a pivot (33) eccentrically attached with respect to said cross-section at each end of the shutter element, and
   (c) means to rotate (34) attached to a said pivot to rotate said shutter element less than one revolution,
   to thereby move said shutter element into or out of said main optical path (3).

9. The optical apparatus of claim 1, which additionally includes;
   (a) a clutch-actuated capstan (46),
   (b) an electronic control means (36),
   (c) electrical connections from said control means to;
      (1) the clutch of said capstan,
      (2) said shutter (26), and
      (3) the electronics (42) controlling the illumination of auxiliary object (16), and
   (d) a sequencing structure of said control means to selectively;
      (1) open said shutter and actuate the capstan clutch (52), or
      (2) energize said electronics (42) to illuminate said auxiliary object (16).

* * * * *